United States Patent [19]
Hitomi et al.

[11] Patent Number: 5,421,308
[45] Date of Patent: Jun. 6, 1995

[54] CONTROL SYSTEM FOR ENGINE WITH MECHANICAL SUPERCHARGER

[75] Inventors: Mitsuo Hitomi; Tadyoshi Kaide, both of Hiroshima, Japan

[73] Assignee: Mazda Motor Corporation, Hiroshima, Japan

[21] Appl. No.: 45,430

[22] Filed: Apr. 13, 1993

[30] Foreign Application Priority Data

Apr. 13, 1992 [JP] Japan .................................. 4-92508

[51] Int. Cl.$^6$ ............................................. F02B 33/00
[52] U.S. Cl. ................................ 123/559.1; 123/90.15
[58] Field of Search ................... 23/559.1, 90.15, 90.16

[56] References Cited

U.S. PATENT DOCUMENTS

| | | | |
|---|---|---|---|
| 4,458,606 | 9/1990 | Hitomi et al. | 123/559.1 |
| 5,076,222 | 12/1991 | Kawamura | 123/90.15 |
| 5,233,831 | 8/1993 | Hitomi et al. | 123/90.15 |

FOREIGN PATENT DOCUMENTS

| | | | |
|---|---|---|---|
| 0376714 | 7/1990 | European Pat. Off. | 123/90.15 |
| 2942326 | 4/1981 | Germany . | |
| 2-119641 | 5/1990 | Japan . | |

Primary Examiner—Timothy S. Thorpe
Assistant Examiner—Charles G. Freay
Attorney, Agent, or Firm—Keck, Mahin & Cate

[57] ABSTRACT

A control system for an engine with a mechanical supercharger supercharges intake air. The control system has a valve timing variable mechanism for varying an opening and closing timing of an intake valve, a fuel injector delivering fuel in an intake stroke of each of the cylinders of the engine in a high load and low speed region of the engine, and a controller for controlling the valve timing variable mechanism. In a high load region of the engine, an overlapping period of an intake valve and an exhaust valve is longer in a high speed region than in a low speed region. A closing time of the intake valve is earlier than a predetermined optimum closing time and a closing time of the intake valve in a high speed region is later than in the low speed region.

6 Claims, 4 Drawing Sheets

CONTROL SYSTEM FOR ENGINE WITH MECHANICAL SUPERCHARGER

BACKGROUND OF THE INVENTION

1. Field of the Invention

The present invention relates to a control system for an engine with a mechanical supercharger and, in particular, to a control system for an engine with a mechanical supercharger in which an overlapping period of an intake valve opening period and an exhaust valve opening period is controlled so as to be changed.

2. Description of Related Art

There is known a conventional control system for an engine with a mechanical supercharger which controls an intake valve and an exhaust valve so as to change an overlapping period of the intake valve opening period and the exhaust valve opening period. Japanese Patent Laid-Open Publication No. 2-119641 discloses such a conventional control system for an engine including a mechanical supercharger, which is driven by the engine and supercharges intake air, and a controller by which an overlapping period of an intake valve and an exhaust valve is changed according to engine operating conditions, i.e., the higher the load of the engine becomes or the higher the engine speed becomes, the longer the overlapping period is provided.

In an engine with a supercharger, the intake air pressure becomes larger than the exhaust air pressure in many cases. On the other hand, such a phenomenon does not occur in an engine with a turbocharger which charges the intake air by utilizing exhaust air energy. Therefore, in an engine with a mechanical supercharger, when the overlapping period of the intake valve and the exhaust valve is constant, the overlapping period constitutes a larger portion of the total period in the low engine speed region than in the high engine speed region. As a result, in an engine with a mechanical supercharger, part of the supplied fuel in an intake port flows out directly to an exhaust port through a combustion chamber of the engine without the fuel being burned. This is called blow-by of fuel.

When the overlapping period of the intake valve and the exhaust valve in the low speed region of the engine is provided as a small value, as in the conventional engine shown in the Patent Publication mentioned above, the blow-by of fuel can be prevented to a certain extent. Further, since the overlapping period can be made large in the high speed region of engine operation, a sufficient absolute overlapping period can be obtained. As a result, remaining burned gas in the combustion chamber is cleaned out by new air so that volumetric efficiency of the intake air in the combustion chamber can be increased. Further, the intake air can be filled by the low charged pressure and therefore the mechanical supercharger has a low load and fuel consumption can be improved.

However, as a matter of fact, it is impossible to prevent effectively the blow-by of fuel to the exhaust port. Namely, when the piston moves from the bottom dead center to the top dead center after the fuel is supplied into the combustion chamber by an intake stroke, the fuel is forced to return back to the intake port through the intake valve while the intake valve is being opened. The returned fuel in the intake port then goes to the exhaust port without being burned when the intake valve opens and the opening period of the intake valve overlaps with that of the exhaust valve. As a result, it is actually impossible to prevent the blow-by of fuel.

SUMMARY OF THE INVENTION

It is, therefore, an object of the present invention to provide a control system for an engine with a mechanical supercharger which can prevent the blow-by of fuel to an exhaust port by controlling the fuel in the combustion chamber so that it does not return back to the intake port when the piston moves from the bottom dead center to the top dead center.

It is another object of the present invention to provide a control system for an engine with a mechanical supercharger which can improve fuel consumption.

These and other objects are achieved, according to the present invention, by providing a control system for an engine with a mechanical supercharger supercharging intake air, comprising, valve timing variable means for varying opening and closing timing of an intake valve, a fuel injector delivering fuel in an intake stroke of each of cylinders of the engine in a high load and low speed region of the engine, and means for controlling said valve timing variable means so that, in a high load region of the engine, an overlapping period of an intake valve and an exhaust valve is longer in a high speed region than in a low speed region, a closing time of the intake valve is earlier than a predetermined optimum closing time, and a closing time of the intake valve in a high speed region is later than in the low speed region.

Preferably, the controlling means controls the valve timing variable means so that, in an operating region of the engine, other than a high load and low speed region and a low load and low speed region, the overlapping period of the intake valve and the exhaust valve is longer than that in other regions, and a closing time of the intake valve is later than that in the other regions.

The above and other objects and features of the present invention will be apparent from the following description by making reference to the accompanying drawings showing preferred embodiments of the present invention.

DESCRIPTION OF THE PREFERRED EMBODIMENTS

The present invention will now be explained with reference to the preferred embodiments and the drawings.

Figure 2:
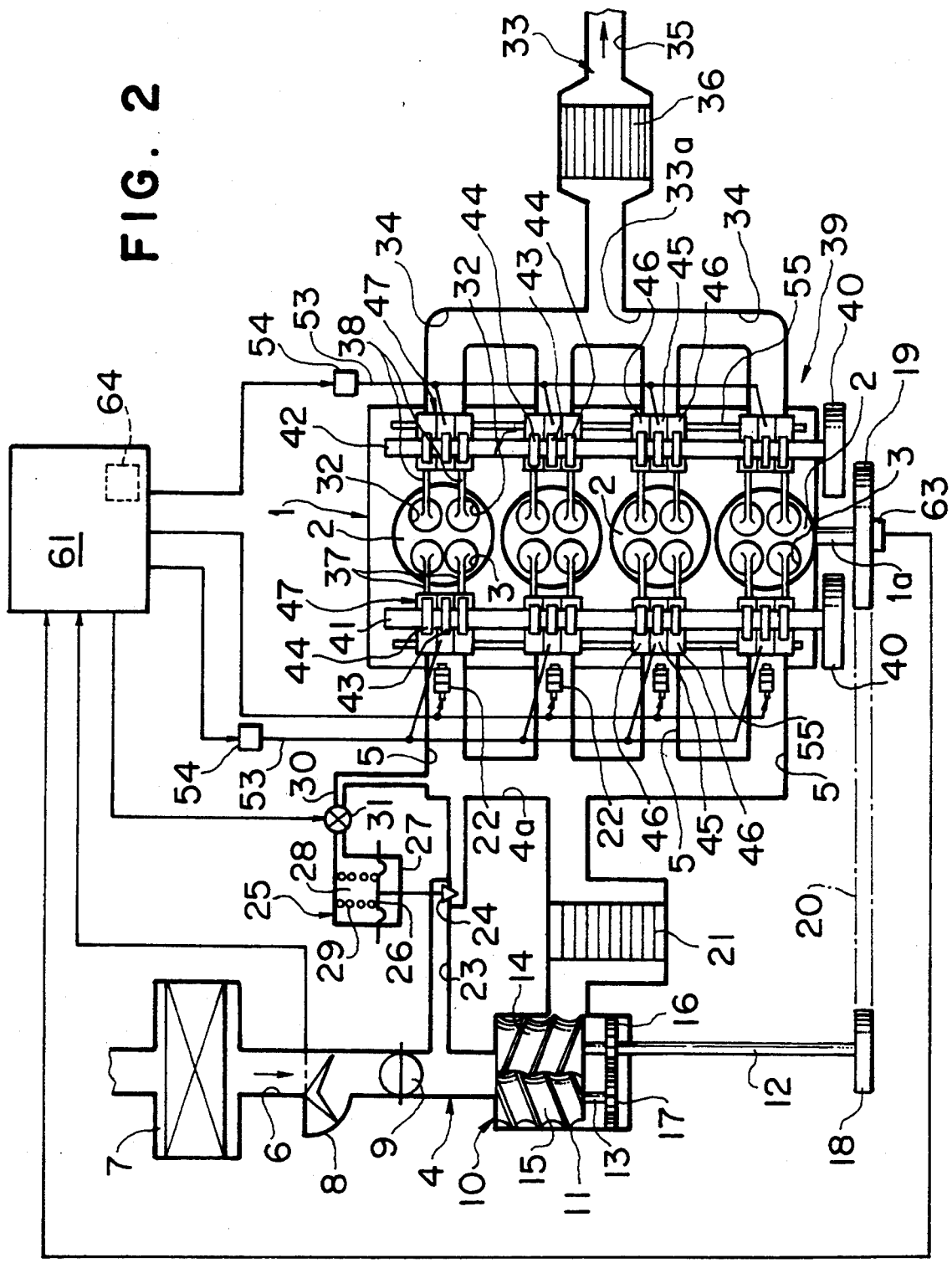
FIG. 2 is a general diagram showing an embodiment of the present invention.

Referring to FIG. 2, a straight type engine 1 includes four cylinders 2 to which two intake ports 3 and two exhaust ports 32 are open. The respective intake ports 3 are opened or closed by respective intake valves 37 and the respective exhaust ports 32 are opened or closed by respective exhaust valves 38. The respective intake ports 3 are provided as a downstream portion of an intake passage 4. The intake passage 4 includes four independent intake passages 5 having the intake ports 3 disposed in the downstream portion thereof, and one main intake passage 6 having a gathering portion 4a in the downstream portion thereof to which the four independent intake passages 5 are connected on upstream portions thereof. An upstream portion of the main intake passage 6 is connected to an air cleaner 7 for cleaning intake air. In the downstream portion from the air cleaner in the main intake passage 6, there are disposed, in order, an air flow meter 8 for detecting an amount of intake air, a throttle valve 9 for controlling opening of the main intake passage 6 or the intake passage 4, a supercharger 10 for compressing and consequently supercharging the intake air, and an intercooler 21 for cooling the supercharged intake air. Fuel injectors 22 are disposed in the vicinity of the respective intake ports 3 so as to inject the fuel into the cylinders 2.

The supercharger 10 is an internal compression type mechanical supercharger which includes male and female rotors 14, 15 in a housing 11 which are rotatably supported with respective rotor shafts 12, 13. The rotors 14, 15 rotate in opposite directions from each other by gears 16, 17 secured to the respective rotor shafts 12, 13 which are in mesh with each other. Secured to the end of the rotor shaft 12 of the one rotor 14 is a pulley 18 which is connected through a driving belt 20 to a pulley 19 secured to a crank shaft 1a of the engine 1. The engine 1 rotates the rotors 14, 15 by which the intake air is sucked into the housing 11, compressed and finally discharged from the housing 11.

There is provided a relief passage 23 having a downstream portion which is connected to the gathering portion 4a of the intake passage 4 and an upstream portion which is connected to a portion located between the throttle valve 9 and the supercharger 10 in the main intake passage 6. As a result, a part of the intake air discharged from the supercharger 10 to the gathering portion 4a is relieved to an upstream portion of the supercharger 10 in the intake passage 4 through the relief passage 23. The relief passage 23 is provided with a control valve 24 which controls supercharged pressure of the intake air supplied to the engine 1 by controlling an amount of relieved intake air through the relief passage 23. The control valve 24 is driven by an actuator 25. The actuator 25 includes a diaphragm 26 connected to the actuator 25, a pressure chamber 28 defined in a casing 27 by the diaphragm 26, and a spring 29 provided in pressure chamber 28 for biasing the control valve 24 to the closing direction. The pressure chamber 28 is communicated through a passage 30 to the gathering portion 4a of the intake passage 4. The passage 30 is provided with a duty solenoid valve 31 which controls the pressure of the supercharged intake air by controlling an amount of the supercharged intake air introduced into the pressure chamber 28. Namely, when an opening of the duty solenoid valve 31 is large, the intake air has high supercharged pressure, since the introduced pressure in the pressure chamber 28 becomes high. Therefore, an opening of the control valve 24 becomes small and an amount of the relieved supercharged intake air also becomes small. On the other hand, when an opening of the duty solenoid valve 31 is small, the intake air has low supercharged pressure, since the introduced pressure in the pressure chamber 28 becomes low. Therefore, an opening of the control valve 24 becomes large and an amount of the relieved supercharged intake air also becomes large.

The respective exhaust ports 32 of the engine 1 are provided as an upstream portion of an exhaust passage 33. The exhaust passage 33 includes four independent exhaust passages 34 whose upstream portions are provided as the exhaust ports 32, and a main exhaust passage 35 whose gathering portion 33a is connected to the downstream portions of the four independent exhaust passages 34. The main exhaust passage 35 is provided with an exhaust gas cleaner 36 for cleaning the exhaust gas.

The engine 1 is provided with a valve driving mechanism 39 for driving respective intake valves 37 and exhaust valves 38 so as to open or close. The valve driving mechanism 39 includes an intake cam shaft 41 and an exhaust cam shaft 42, both of which are driven so as to rotate synchronously with the crank shaft 1a of the engine 1 through timing pulleys 40 and a timing belt (not shown). The respective cam shafts 41, 42 are provided with cams 43, 44 in each of the cylinders 2. By the cams 43, 44, rocker-arms 45, 46 are pushed out so as to rock around a shaft 55 so that the intake valves 37 and exhaust valves 38 are driven so as to open or close. The valve driving mechanism 39 is provided in each of the cylinders 2 with a valve timing variable mechanism 47 which changes an overlapping period of both the intake valve 37 and exhaust valve 38 by varying open-close timing of both valves 37, 38.

Figure 4:
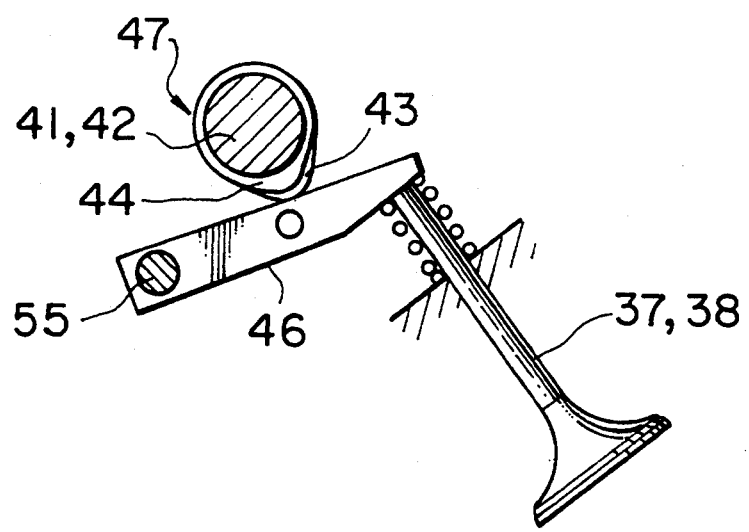
FIG. 4 is a schematic front view showing a valve timing variable mechanism.
Figure 5:
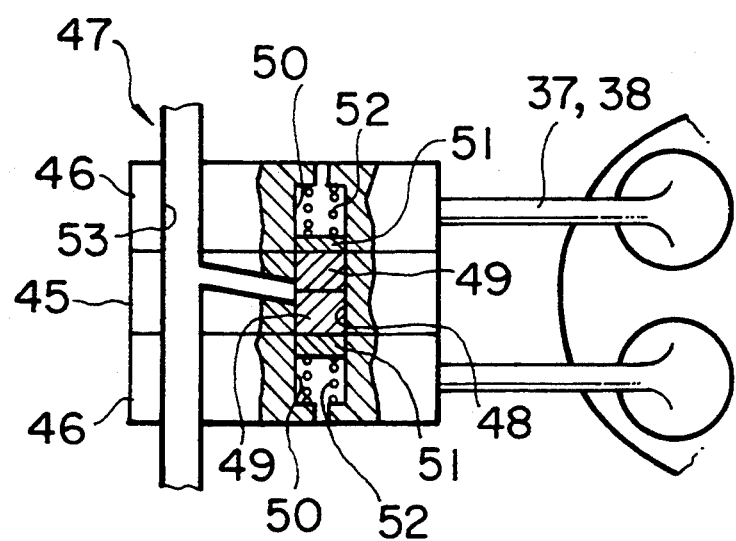
FIG. 5 is a schematic plane view showing a valve timing variable mechanism.

Namely, as shown in FIGS. 4 and 5, the cams 43, 44 consist of a first cam 43 located in a center portion and two second cams 44 located on both sides of the first cam 43 where the first cam 43 has a cam top profile which is higher than that of the second cams 44. The rocker-arms 45, 46 consist of a first rocker-arm 45 pushed out by the first cam 43 and two second rocker-arms 46 located on both sides of the first rocker-arm 45 and pushed out by the second cams 44 where a front edge of each of the second rocker-arms 46 contacts with an upper end of each valve stem of the respective intake vales 37 and exhaust valves 38.

Referring to FIG. 5, the first rocker-arm 45 is provided in an intermediate portion thereof with a penetrating hole 48 extending in parallel with the cam shafts 41, 42 and with a pair of connecting pins 49 which are received slidably in the penetrating hole 48 and are movable from the side surfaces of the respective rocker-arms 45. The two second rocker-arms 46 are provided respectively on side surfaces facing the first rocker-arm 45 with connecting holes 50 each of which corresponds to the penetrating hole 48. Each of the respective connecting holes 50 of the second rocker-arms 45 receives a slidable spring receiver 51 contacting with a front end of the connecting pin 49. The spring receiver 51 is biased in a direction to which the connecting pins 49 are received in the penetrating hole 48 of the first rocker-arm 45 by a spring 52 which is inserted between the spring receiver 51 and a bottom portion of the connecting hole 50. The spring receiver 51 is able to slide so as not to project from the side surface of the second rocker-arm 46.

Referring back to FIG. 2, there are provided hydraulic pressure supplying conduits 53 which supply hydraulic pressure into the penetrating hole 48 of the first rocker-arm 45 at back end portions of the connecting pins 49. The respective hydraulic pressure supplying conduits 53 are provided with solenoid valves 54.

When the solenoid valves 54 are operated to be closed, the hydraulic pressure is not supplied to the back end portions of the connecting pins 49. As a result, the connecting pins 49 are received in the penetrating hole 48 by a biasing force of the spring 52, so that the second rocker-arms 46 are not connected with the first rocker-arm 45. In this situation, the intake valves 37 and exhaust valves 38 are driven so as to open or close by the second cams 44 whose cam top profile is low, so that the opening period of the respective valves 37, 38 are shortened. To be concrete, referring to FIG. 1, the intake valves 37 are opened at, for example, 15 degrees of the crank angle CA before a top dead center TDC and are closed at 20 degrees CA after a bottom dead center BDC. The exhaust valves 38 are opened at 30 degrees CA before BDC and are closed at 15 degrees CA after TDC.

Figure 1:
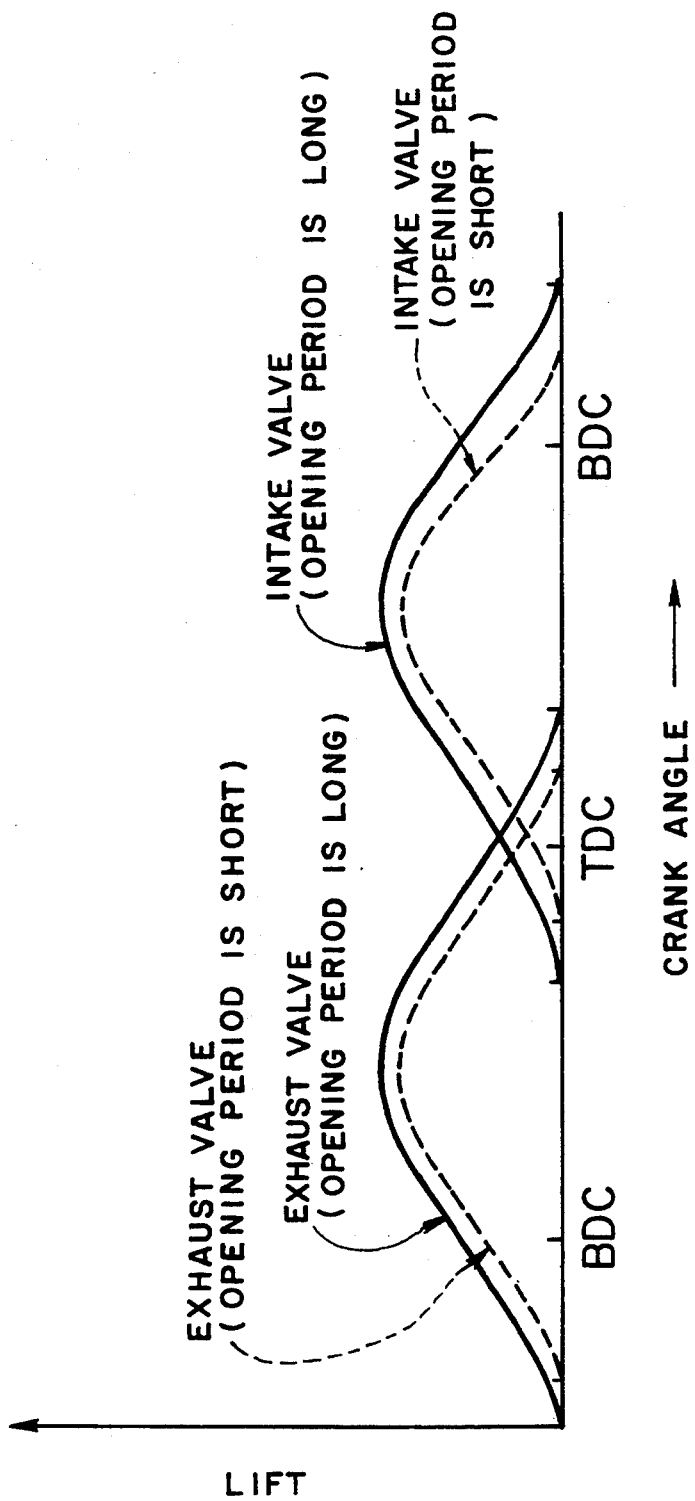
FIG. 1 is a characteristic diagram showing characteristics of intake and exhaust valves of an engine in accordance with the present invention.

On the other hand, when the solenoid valves 54 are operated to be opened, the hydraulic pressure is supplied to the back end portions of the connecting pins 49. As a result, the connecting pins 49 move against the biasing force of the spring 52 to the connecting hole 50 of the second rocker-arm 46 and finally the half front portions of the pins 49 are inserted into the connecting hole 50, so that the second rocker-arms 46 are connected with the first rocker-arm 45 and the first and second rocker-arms 45, 46 are driven so as to rock integrally. Under this situation, the intake valves 37 and exhaust valves 38 are driven so as to open or close by the first cam 43 whose cam top profile is high, so that the opening periods of the respective valves 37, 38 are made longer. Referring to FIG. 1, the intake valves 37 are opened at, for example, 30 degrees of the crank angle CA before a top dead center TDC and are closed at 50 degrees CA after a bottom dead center BDC. The exhaust valves 38 are opened at 50 degrees CA before BDC and are closed at 30 degrees CA after TDC. The closing time of the intake valves 37, which is 50 degrees CA after BDC, is called an optimum closing time of the intake valves in the embodiment of the present invention. At the optimum closing time, the volumetric efficiency of the intake air becomes a maximum value in a total engine operating region.

The control valve 24, the respective fuel injectors 22 and the solenoid valves 54 are controlled by a control unit 61 to which at least an output signal from an engine speed sensor 63, detecting an engine speed by the rotation speed of the crank shaft 1a of the engine 1, and an output signal from the air flow sensor 8 are provided.

Further, the control unit 61 determines an amount of fuel delivered based on the output signals from the engine speed sensor 63 and the air flow sensor 8, and inputs a signal representative of the determined amount of fuel delivered to the respective fuel injectors 22 in each intake stroke of the respective cylinders 2, so that the injectors 22 deliver the fuel in the intake stroke.

The control unit 61 includes a control means 64 for controlling the valve timing variable mechanism 47 in the following manners.

Figure 3:
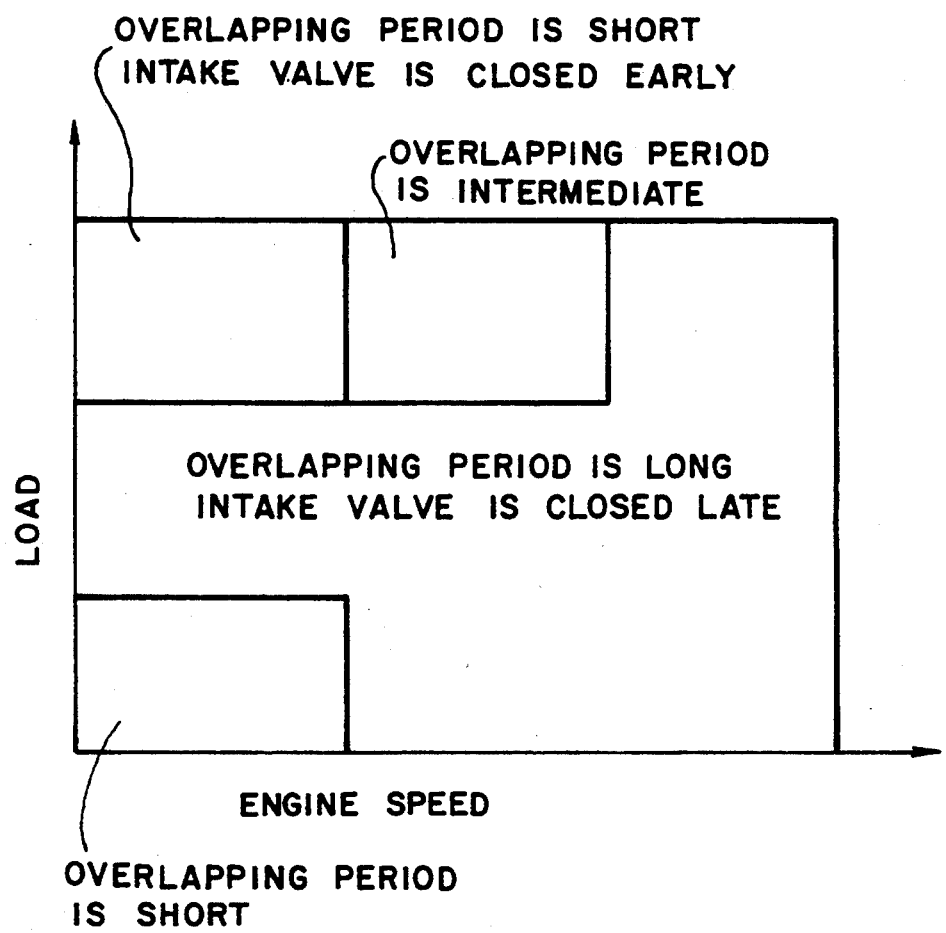
FIG. 3 is a characteristic diagram showing engine operating regions in which the overlapping period of the intake and exhaust valves and the closing timing of the intake valve are provided.

Referring to FIG. 3, an engine operating region is first determined based on the engine speed and the engine load or the amount of intake air. When the engine 1 is operated in a high load and low speed region, both solenoid valves 54 are operated to be closed so that the opening periods of both intake valves 37 and exhaust valves 38 are shortened and therefore the overlapping periods of the intake valves 37 and the exhaust valves 38 are shortened. When the engine 1 is operated in a high load region and an intermediate speed region, the solenoid valve 54 only for the intake valves 37 are operated to be opened and the solenoid valves 54 for the exhaust valves 38 are operated to be closed so that the opening periods of the intake valves 37 are made longer and, therefore, the overlapping periods of the intake valves 37 and the exhaust valves 38 are made intermediate. Further, when the engine 1 is operated in a high load and high speed region, both solenoid valves 54 are operated to be opened so that the opening periods of both intake valves 37 and exhaust valves 38 are made longer and therefore the overlapping periods of the intake valves 37 and the exhaust valves 38 are made longer than that in the low speed region.

Further, when the engine 1 is operated in the high load and low speed region, in which the overlapping period of the intake and exhaust valves 37, 38 is short, the closing time of the intake valves 37 is provided at 20 degrees CA after the bottom dead center BDC, which is earlier than the above-mentioned optimum closing time (50 degrees CA after BDC). On the other hand, when the engine 1 is operated in the high load and high speed region, in which the overlapping period of the intake and exhaust valves 37, 38 is long, the closing time of the intake valves 37 is provided as the above-mentioned optimum closing time, which is later than that in the above-mentioned low speed region.

On the other hand, when the engine 1 is operated in a low load and low speed region, both solenoid valves 54 are operated to be closed so that the opening periods of both intake valves 37 and exhaust valves 38 are shortened and, therefore, the overlapping periods of the intake valves 37 and the exhaust valves 38 are shortened. Further, when the engine 1 is operated in an operating region other than the low load and low speed region, the high load and low speed region and the high load and intermediate speed region, both solenoid valves 54 are operated to be opened so that the opening periods of both intake valves 37 and exhaust valves 38 are made longer and, therefore, the overlapping periods of the intake valves 37 and the exhaust valves 38 are made longer. Also, the closing time of the intake valves 37 is provided at 50 degrees CA after BDC, which is later than that in other regions.

In operation, the amount of fuel delivered is determined based on the signals from the air flow sensor 8 and the engine speed sensor 63, while the engine is being operated, and the determined amount of fuel is delivered from the injectors 22 when the respective cylinders are in the intake stroke.

At the same time, the control unit 61 controls the valve timing variable mechanism 47 so that the opening periods of the intake and exhaust valves 37, 38 and the overlapping period of the valves 37, 38 are changed. As shown in FIG. 3, when the engine is operated in the high load and low speed region, both solenoid valves 54 are operated to be closed, so that the opening periods of both intake and exhaust valves 37, 38 are shortened and, as a result, the overlapping period of the valves 37, 38 is shortened. Since the overlapping period of the intake and exhaust valves 37, 38 is shortened in the high load and low speed region of the engine, the blow-by of fuel to the exhaust port 32 can be controlled effectively during the overlapping period. Further, since the closing time of the intake valves 37 is provided at 20 degrees CA after BDC, which is earlier than the optimum closing time 50 degrees CA after BDC in the high load and low speed region of the engine 1, the intake valves 37 are closed in an early stage when the piston moves from the bottom dead center toward the top dead center. As a result, the fuel supplied into the combustion chamber in the cylinder 2 during the intake stroke can be prevented from returning back to the intake port 3 through the intake valves 37 while they are opened, so that the fuel returning back to the intake port 3 is prevented from going to the exhaust port 32 through the combustion chamber without fuel being burned. The combination of the short overlapping period of the intake and exhaust valves 37, 38 and the early closing time of the intake valves 37 is effective to prevent the blow-by of fuel to the exhaust port 32.

In the high load and intermediate speed region of the engine 1, the solenoid valve 54 for the intake valves 37 is operated to be opened and the solenoid valve 54 for the exhaust valves 38 is operated to be closed. As a result, the opening period of the intake valves 37 is made longer, so that the overlapping period of the intake and exhaust valves 37, 38 becomes intermediate.

In the high load and high speed region of the engine 1, both solenoid valves 54 are operated to be opened so that the opening periods of the both intake and exhaust valves 37, 38 are made long and, as a result, the overlapping period of the intake and exhaust valves is made longer than that in the low speed region. Further, under the condition of the overlapping period being long in the high speed region, the closing time of the intake valves 37 is provided at the above-mentioned optimum closing time, which is later than that in the low speed region. As a result, since a necessary absolute overlapping period in the high speed region of the engine 1 can be obtained, scavenging ability of the remaining gas in the combustion chamber can be improved and, as a result, the volumetric efficiency can be increased. Further, since the fuel gas can be filled in the cylinder with a relatively low supercharged pressure, the mechanical supercharger 10 has a low load and, as a result, the fuel consumption can be improved.

In the operating region of the engine 1 other than the low load and low speed region and the high load region, as the high load and high speed region, both solenoid valves 54 are operated to be opened so that the opening periods of both the intake and exhaust valves 37, 38 are made long and, as a result, the overlapping period of the intake and exhaust valves is made longer than those in the other regions. Further, the closing time of the intake valves 37 is provided at the optimum closing time which is later than those in the other regions. As a result, pumping loss can be decreased and, therefore, the fuel consumption can be improved.

In the embodiment of the present invention mentioned above, the fuel injectors 22 deliver the fuel into the cylinder in the intake stroke of each of the cylinders in all operating regions of the engine 1. However, the fuel injectors 22 preferably deliver the fuel in the intake stroke at least in the high load and low speed region where the overlapping period of the intake and exhaust valves 37, 38 is shortened and the closing time of the intake valve 37 is adjusted so that the intake valve 37 is closed early.

The overlapping period of the intake and exhaust valves 37, 38 may be changed by only changing the opening period of the intake valves 37.

While the present invention has been illustrated by means of several preferred embodiments, one of ordinary skill in the art will recognize that modifications and improvements can be made while remaining within the spirit and scope of the invention. The scope of the invention is determined solely by the appended claims.

What is claimed is:

1. A control system for an engine comprising a mechanical supercharger driven by the engine and supercharging intake air:

valve timing variable means for varying an opening and closing timing of an intake valve;

a fuel injector delivering fuel during an intake stroke of each of cylinders of the engine in at least a high load and low speed region; and controlling means for controlling said valve timing variable means so that an overlapping period of the intake valve and an exhaust valve is shorter in a high load and low speed region of the engine than in a high load and high speed region of the engine and a closing time of the intake valve in the high load and low speed region of the engine is earlier than that in the high load and high speed region of the engine.

2. A control system according to claim 1, wherein said valve timing variable means varies opening and closing timings of the intake valve and the exhaust valve.

3. A control system according to claim 1, wherein said controlling means controls the valve timing variable means so that, in an operating region of the engine other than the high load and low speed region and a low load and low speed region, the overlapping period of the intake valve and the exhaust valve is longer than that in the high load and low speed region and the low load and low speed region, and the closing time of the intake valve is later than that in the high load and low speed region and the low load and low speed region.

4. A control system according to claim 1, wherein said controlling means controls the valve timing variable means so that, the overlapping period of the intake valve and the exhaust valve in an intermediate speed region is longer than that in a low speed region and is shorter than that in a high speed region.

5. A control system according to claim 1, wherein said controlling means controls the valve timing variable means so that, in a low load region of the engine, the overlapping period of the intake valve and the exhaust valve is shorter in a low speed region than in a high speed region.

6. A control system according to claim 1, wherein said mechanical supercharger is an internal compression type mechanical supercharger.

* * * * *

UNITED STATES PATENT AND TRADEMARK OFFICE
CERTIFICATE OF CORRECTION

PATENT NO.:     5,421,308
DATED      :    June 6, 1995
INVENTOR(S):    Mitsuo HITOMI and Tadayoshi KAIDE It is certified that error appears in the above-identified patent and that said Letters Patent is hereby corrected as shown below:

On the title page, item [75], please correct the first name of the second inventor:

Delete "Tadyoshi" and insert --Tadayoshi--.

Signed and Sealed this

Seventh Day of November, 1995

*Attest:*

BRUCE LEHMAN

*Attesting Officer*    Commissioner of Patents and Trademarks